July 8, 1952          M. BONNET          2,602,385
STATIC APPARATUS FOR PARALLAX STEREOGRAM PHOTOGRAPHY
Filed Feb. 26, 1948          2 SHEETS—SHEET 1
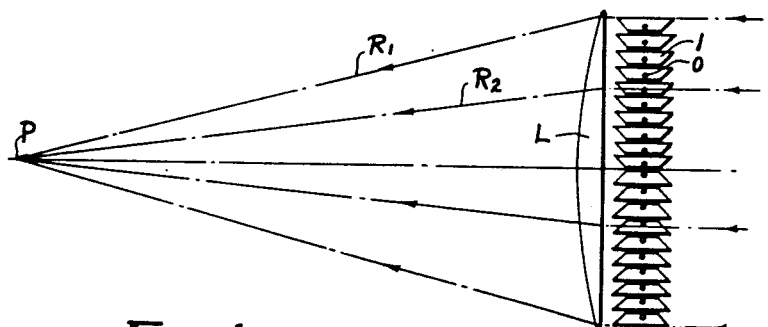
Fig. ~1~
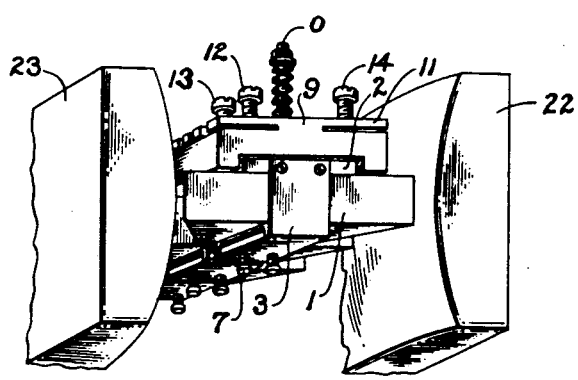
Fig. ~2~
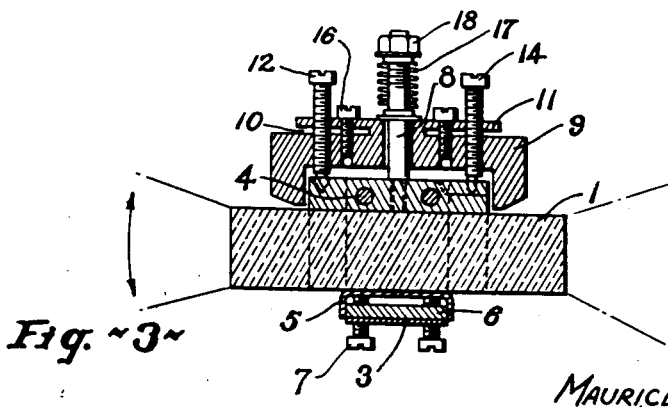
Fig. ~3~
INVENTOR.
MAURICE BONNET
BY Haseltine, Lake & Co.
AGENTS July 8, 1952     M. BONNET     2,602,385
STATIC APPARATUS FOR PARALLAX STEREOGRAM PHOTOGRAPHY
Filed Feb. 26, 1948     2 SHEETS—SHEET 2
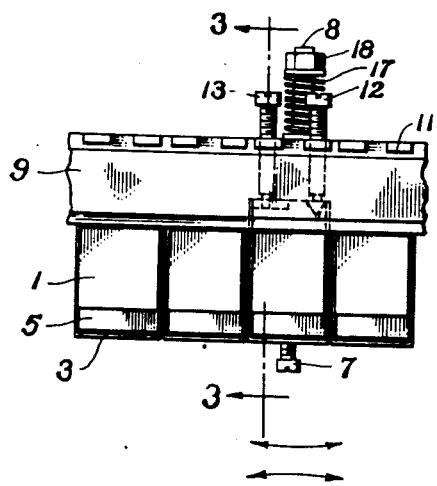
Fig.~4~
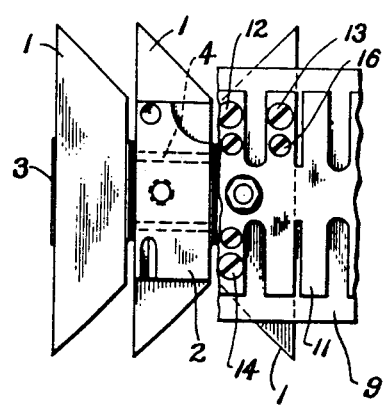
Fig.~5~
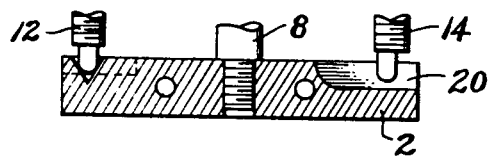
Fig.~7~
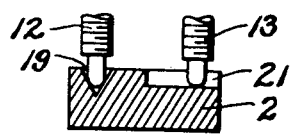
Fig.~6~
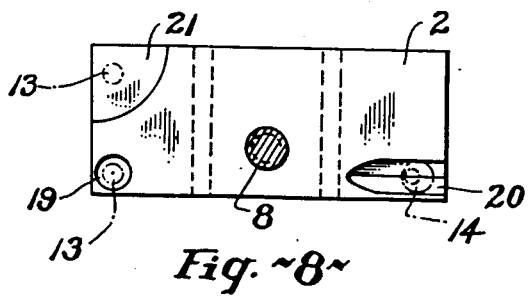
Fig.~8~
INVENTOR.
MAURICE BONNET
BY Haseltine, Lake & Co.
AGENTS Patented July 8, 1952

2,602,385

UNITED STATES PATENT OFFICE 2,602,385

STATIC APPARATUS FOR PARALLAX STEREOGRAM PHOTOGRAPHY

Maurice Bonnet, Paris, France, assignor to La Reliephographie, Société pour l'Exploitation des Procédés de Photographie en Relief Maurice Bonnet, Paris, France, a French corporation Application February 26, 1948, Serial No. 11,117
In France June 12, 1946

Section 1, Public Law 690, August 8, 1946
Patent expires June 12, 1966

3 Claims. (Cl. 95—18)

Certain cameras for parallax stereogram photography comprise a large diameter objective lens creating the stereoscopic base of observation, this objective lens being suitably combined with optical reversing members which enable a negative to be effected in normal relief (orthoscopic) and not in reversed relief (pseudoscopic).

The present invention relates to an improvement to apparatus of this kind, mainly consisting in rendering each of these reversing members individually adjustably in the three planes. The invention also bears upon improved means of mounting these reversing members, enabling this individual adjustment to be effected under strict conditions of precision. Hence, the invention ensures the improving of the photographic results effected.

An object of the present invention is to provide in a static apparatus for parallax stereogram photography, comprising a large diameter objective lens combined with a horizontal row of reversing optical members, an individual base-plate for each member, a collar for clamping each member to the associated base plate, each base-plate having a threaded stud extending therefrom and passing loosely through a corresponding opening of a common mounting bar, a spring interposed the mounting bar and a nut on the stud, and three adjusting screws carried by the mounting bar for each base-plate and arranged at the three apexes of a right-triangle to act against the face of the related base-plate directed away from the reversing member held thereon, one of the screws being received in a conical hollow of said face, another of the screws being engaged in a linear slot of said face and the third screw bearing against a planar face portion to enable each reversing member to be adjusted according to the "point-line-plane" principle used in optics.

By virtue of the invention, the optical members in question, besides their function of reversal can be utilised for the purpose of eliminating, at least to a great extent, the imperfections (spherical aberrations) of the lens or lenses constituting the objective. In fact the individual adjustment, in the three planes, of the optical reversing members used permits the exact superpositioning, in the focal plane of the objective lens, of the image fractions refracted by each of these members, and thus of correcting the caustic of the objective lens. The latter may therefore consist without disadvantage of a simple lens, the cost of which is very low. The greater the diameter of the objective lens, the more marked is this advantage.

In a form of construction chosen for the detailed description of the invention, the optical reversing members are constituted by simple wollaston prisms. It need hardly be said, however, that they may be replaced by known afocal systems, for instance, or by roof-shaped Wollaston prisms.

Moreover, the device according to the invention may of course also be combined with objective lenses constituted by two or more lenses, corrected to a greater or less degree.

In the accompanying drawings:

Figure 1 diagrammatically illustrates the action of correction of the optical reversing members when they are individually adjustable, in accordance with the invention.

Figure 2 is a perspective view of an objective lens for parallax stereogram photography combined with optical reversing members mounted according to the invention.

Figure 3 is a vertical sectional view taken along the line 3—3 of Fig. 4 and showing the mounting and adjusting device according to the invention.

Figure 4 is a front elevational view of several optical reversing members showing the mounting and adjusting device of only one member for purposes of clarity.

Figure 5 is a top plan view of the assembly of Figure 4, with a portion of the common mounting bar cut away.

Figure 6 illustrates in detail and on an enlarged scale, in transverse section, the fixation part or base-plate of each reversing member.

Figure 7 is a longitudinal sectional view of the same part.

Figure 8 is a top plan view of the base-plate.

It is known that the marginal rays refracted by an uncorrected lens may converge at a point which is spaced from the point of convergence of the central rays thus creating a caustic, the size of which varies according to the extent of the imperfections in the lens.

In Figure 1, on the other hand, the lens L is preceded by a horizontal row of prisms $i$, which in accordance with the invention, are each individually adjustable about a vertical axis O. By causing the outer prisms to diverge to a suitable extent, and causing the central prisms to converge by the desired amount, it will be possible to eliminate the caustic, all the rays R1 and R2 then converging exactly to the focus P of the lens.

It need hardly be said that it is possible to effect the convergence of the rays R1 and R2 at afocus which is either closer to or further away from the lens according to the adjustment given to the prisms. Thus, to a certain extent, the device in question enables the power of the lens L to be modified, while correcting it for spherical aberration.

According to the invention, each reversing prism is mounted as represented in Figures 3 to 8.

The prism 1 is secured to a base-plate 2 by means of a collar 3 extending therearound and fixed to the said base-plate by screws 4. A tensioning device constituted by plates 5 and 6 and pressure screws 7 enables each of the prisms to be locked on its base plate. This base-plate has a screw-threaded tail or stem 8, which, with a certain clearance, passes through a common supporting bar 9, which is a U-shaped cross-section (Figure 3) in order that it may have the necessary rigidity and is suitably carried by the camera frame (not shown). In this bar 9, longitudinal slots 10 are formed to give rise to resilient vanes 11, four in number per prism (see Figure 5). Securing screws 12, 13 and 14 are screwed in registering tapped holes in the bar 9 and in the vanes 11. Locking screws 16 are screwed into the bar 9 and pass through smooth holes in the vanes 11.

The base-plate 2 for each reversing prism 1 is resiliently pressed against the related securing screws 12, 13, 14 by a spring 17 interposed between a nut 18 of the screw-threaded tail 8 and the upper face of the common supporting bar 9.

As Figure 8 illustrates, the securing screws 12, 13, 14 are arranged at three points corresponding to the apexes of a right-angled triangle, the tail or stem 8 being situated within this triangle.

The screws 12, 13, 14 act upon the base-plate 2 against the action of the spring 17, according to the point-line-plane principle well know in optics.

For this purpose (see Figure 8), the point of one of the three screws, 12 for example, bears in a conical hollow 19 formed in the base-plate 2, and the point of the screw 14 engages in a rectilinear groove 20 extending along the line passing through the centers of the screws 12—14. This screw 14 when displaced axially therefore enables the prism to be turned about an axis of rotation passing through the axes of the screws 12—13, the prism then turning in the direction of the arrows in Figure 3.

The screw 13 bears upon a machined face 21 of the base-plate 2. It therefore enables the prism to be turned about an axis of rotation passing through the axes of the screws 12—14, which is perpendicular to the axis 12—13, the prism then moving in the direction of the arrows of Figure 4.

The clearance provided between the screw threaded tail 8 and the drilling of the bar 9 in which it is engaged is made large enough to permit the various movements of the tail or stem 8 resulting from the adjustments of the base-plate 2.

Finally, and according to the invention, another movement of each prism is provided about the spindle 8, that is to say, according to the arrows of Figure 5. This movement is effected by the eccentricity of a nipple which forms the lower end of the securing screw 14.

By combining all these movements each of the prisms 1 can be adjusted in a very precise manner. Locking of the base-plate 2, and hence of the related prism 1, in the adjusted position is effected by tightening the screws 16, which tend to deform the vanes 11.

Figure 2 illustrates by way of example how the device according to the invention is combined with the objective lens of apparatus for parallax stereogram photography comprising two simple convergent lenses 22, 23, the focal length of one of which (22 for example) corresponds to the view-taking distance, and the focal length of the other (23, for example) to the drawing of the camera. When arranged as in Figure 2, the reversing prism members 1 may be adjusted to correct the spherical aberration of the lenses in the horizontal direction. However, since the selective effect essential for three-dimensional printing is obtained only in the horizontal plane and not in the vertical plane, this correction is completely adequate for correcting the associated lenses.

Having now particularly described and ascertained the nature of the invention and in what manner the same is to be performed, I declare that what I claim is:

1. In a static apparatus for parallax stereogram photography, comprising a large diameter objective lens combined with a horizontal row of reversing optical members, the provision of an individual base-plate for each member, a collar for clamping each member to the associated base-plate, the said base-plate carrying a screw-threaded tail which passes with a certain clearance through a corresponding hole of a common mounting bar, a spring being interposed between the said bar and a nut screwed to the end of the screw-threaded tail, and three setting screws in said bar for each base-plate, arranged at the three angles of a right-angled triangle, and acting upon the face of the base-plate opposite to the reversing member, one of these screws being engaged in a conical hollow, the second in a slot, and the third bearing upon the finished face of the said base-plate, in order to enable each reversing member to be adjusted according to the "point-line-plane" principle used in optics.

2. In apparatus as claimed in claim 1, the second setting screw forming an eccentric nipple, which is adapted to cause, by its rotation, the pivoting of the reversing member about the vertical spindle constituted by the screw-threaded tail, said spindle being situated within the right angled triangle formed by the three screws.

3. In apparatus as claimed in claim 1, a common mounting bar the portion through which the setting screws pass being split at right angles to the axis of these screws, so as to constitute resilient vanes, and locking screws which tend to deform the said vanes and retain the setting screws in adjusted position.

MAURICE BONNET.

REFERENCES CITED

The following references are of record in the file of this patent:

UNITED STATES PATENTS

| Number | Name | Date |
|---|---|---|
| 1,562,463 | Mollberg | Nov. 24, 1925 |
| 1,604,520 | Kleese | Oct. 26, 1926 |
| 2,019,234 | Nistri | Oct. 29, 1935 |
| 2,382,580 | Rackett | Aug. 14, 1945 |

FOREIGN PATENTS

| Number | Country | Date |
|---|---|---|
| 322 | Great Britain | Jan. 7, 1905 |
| 523,756 | France | Apr. 28, 1921 |
| 723,996 | France | Jan. 23, 1932 |
| 485,456 | Great Britain | May 19, 1938 |